(No Model.)

E. HOLTHAUS.
RENDERING TANK.

No. 507,222. Patented Oct. 24, 1893.

Attest:
Edw. F. Kinsey
W. Batson

Inventor.
Emil Holthaus, per
Crane & Miller, Attys.

UNITED STATES PATENT OFFICE.

EMIL HOLTHAUS, OF BARREN ISLAND, NEW YORK.

RENDERING-TANK.

SPECIFICATION forming part of Letters Patent No. 507,222, dated October 24, 1893.

Application filed August 4, 1893. Serial No. 482,414. (No model.)

*To all whom it may concern:*

Be it known that I, EMIL HOLTHAUS, a citizen of the United States, residing at Barren Island, Kings county, New York, have invented certain new and useful Improvements in Rendering-Tanks, fully described and represented in the following specification and the accompanying drawings, forming a part of the same.

The object of this invention is to facilitate the application of steam and heat to the fatty matters which are treated in a rendering tank, to facilitate the separation of the condensed water from the grease, and to remove the grease effectively from the scrap before the opening of the tank; so as to diminish the time and labor involved in the subsequent pressing of the scrap. These objects are effected by providing the strainer or false bottom within the tank with upright perforated pipes communicating with the space below the strainer, and thereby adapted to distribute steam or water throughout the mass of material under treatment.

The invention consists in the constructions hereinafter described and claimed, and which will be understood by reference to the annexed drawings, in which—

Figure 1:
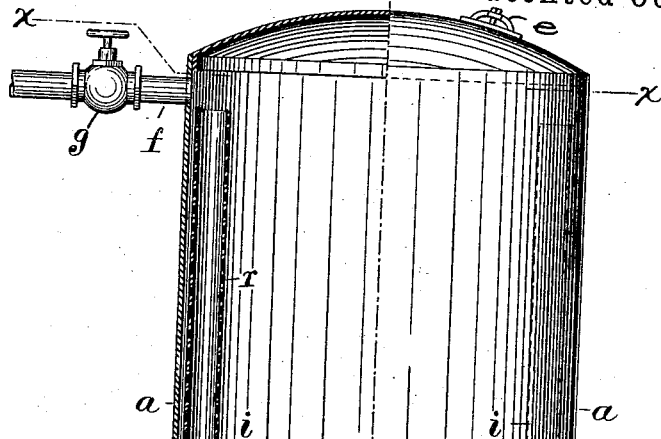
Figure 3:
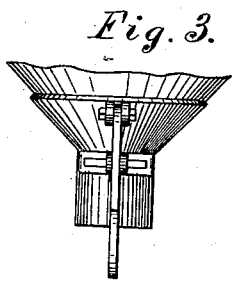
Figure 2:
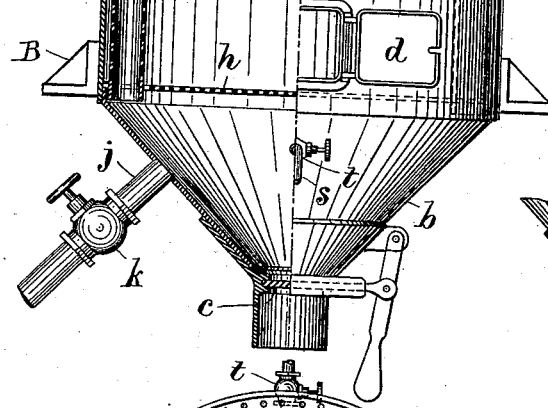

Figure 1 is an elevation, in section at one side of the center line, of a rendering tank provided with my improvements. Fig. 2 is a plan of the same in section on line $x$, $x$, in Fig. 1; and Fig. 3 is a side elevation of the discharge funnel showing the outlet gate.

The tank $a$ is shown of upright cylindrical shape with brackets B upon its sides to sustain it upon suitable supports. The bottom of the tank is formed with funnel $b$ having outlet gate $c$, and one side of the tank is provided with a tight door $d$. The top of the tank is provided with a manhole $e$, and an outlet pipe $f$ provided with cock $g$ is inserted in the shell of the tank, near the top, to discharge the grease therefrom. A strainer $h$ is affixed in the tank at the top of the funnel $b$, and pipes $i$ are inserted through the strainer and extended upward nearly to the top of the tank. Steam pipes $s$ provided with cocks $t$ are inserted in the sides of the funnel $b$, and the pipes $i$ are perforated with numerous holes $r$ to place them in communication with the funnel $b$. A water pipe $j$ provided with cock $k$ is also connected with the funnel $b$.

The operation of the device is as follows: The gate $c$, the door $d$, and cocks $k$ and $t$ are all closed, and the material to be treated is inserted through the man-hole $e$, and the manhole is then secured to close the tank. The outlet cock $g$ being closed at the top of the tank, steam is admitted through the pipe $s$, which penetrates the pipes $i$ and is discharged through the holes $r$ into the contents of the tank. The entire contents of the tank are thus heated and boiled in the most uniform manner. When the grease is wholly extracted from the scrap, the steam cocks $t$ are closed and the cock $g$ opened, and water is then forced into the funnel $b$ through the pipe $j$. The water displaces the grease in the funnel $b$ forcing the same upward through the pipes $i$ and discharging it by the outlet $f$. The water is then diffused through the mass of material by penetrating the apertures in the screen $h$ and also the holes $r$ in the pipes $i$, thus greatly loosening the material in the tank and separating the free grease therefrom, which is discharged from the pipe $f$. When the grease is wholly discharged from the material, the gate $c$ is opened, and the water previously mingled with the material is withdrawn from the tank, its discharge being greatly facilitated by the insertion of the pipes $i$ in the material, the pipes operating to drain the water through the holes $r$ in addition to the drainage effected by the screen $h$. The material is thus compacted in the tank to such a degree that when the door $e$ is opened to remove the same, it is almost entirely free from grease and water; and may thus be handled with more convenience, and may be pressed in suitable curbs with much less labor and expense than heretofore.

Heretofore, the material has been subjected to steam only through the holes in the strainer, and the drainage of the water from the material has been effected in the same manner; but the pressure of the material upon the screen operates to clog up its apertures, and thus interferes seriously with the performance of these functions. By the use of the pipes $i$ which, as shown in the drawings, may be open at the top, the steam is distributed throughout the entire mass of material in the tank, and is also applied to the top of the same; and the rendering operation is thus effected with the utmost rapidity. The open tops of the pipes $i$ also serve to discharge from the upper part of the tank any water that may accumulate therein by condensation during the rendering process. The pipes further serve for the passage, to the upper part of the tank, of the grease which is discharged from the lower part of the material through the screen in the rendering operation, and all of the free grease within the tank is thus readily discharged from the outlet pipe $f$ at the close of the operation.

What I claim as my invention is—

1. In a rendering tank, the combination, with the upright shell $a$ having funnel-shaped bottom $b$ with screen $h$ at the top of the funnel, and outlet door $d$ just above the screen $h$, of the perforated pipes $i$ projected upward from the screen at opposite sides adjacent to the wall of the tank, and opening into the funnel-shaped bottom beneath the screen, as and for the purpose set forth.

2. In a rendering tank having a screen near the bottom, the combination, with such screen, of one or more perforated pipes projected upward from the same and opening into the space beneath the screen, and steam and water pipes connected with the tank below the screen, as herein set forth.

3. In a rendering tank, the combination, with the upright shell $a$ having the man-hole $e$ and outlet door $d$, of the funnel shaped bottom $b$ and the gate $c$, the screen $h$ at the top of the funnel, the perforated pipes $i$ inserted in the screen and extended upward from the same, the outlet pipe from the top of the tank, and steam and water pipes connected with the bottom of the tank, substantially as herein set forth.

In testimony whereof I have hereunto set my hand in the presence of two subscribing witnesses.

EMIL HOLTHAUS.

Witnesses:
H. J. MILLER,
EDW. F. KINSEY.